United States Patent

[11] 3,550,568

| [72] | Inventor | Maurice L. Peterson |
| | | Kerkhoven, Minn. |
| [21] | Appl. No. | 782,996 |
| [22] | Filed | Dec. 11, 1968 |
| [45] | Patented | Dec. 29, 1970 |
| [73] | Assignee | Clayton Edwards |
| | | Kerkhoven, Minn. |
| | | a part interest |

[54] OPPOSING PISTON ENGINE
15 Claims, 9 Drawing Figs.

[52] U.S. Cl. .................................................. 123/51,
74/568, 123/52, 123/90
[51] Int. Cl. ........................................... F02b 75/28,
F02b 25/08
[50] Field of Search ............................... 123/51B4,
51B2, 51B1, 51B, 52A, 90(.4,.5,.9); 74/568

[56] References Cited
UNITED STATES PATENTS

| 898,913 | 9/1908 | Nelson .......................... | 123/51 |
| 953,424 | 3/1910 | Lindsay ........................ | 123/5 |
| 1,324,520 | 12/1919 | Robbins ....................... | 123/90 |
| 2,393,084 | 1/1946 | Wuehr ......................... | 123/51 |
| 2,393,085 | 1/1946 | Wuehr ......................... | 123/51 |
| 2,451,802 | 10/1948 | Burrus et al. ................. | 74/568 |

FOREIGN PATENTS

| 1,195,563 | 3/1959 | France ........................ | 123/52 |

*Primary Examiner*—Wendell E. Burns
*Attorney*—Burd, Braddock & Bartz

ABSTRACT: A two cycle opposing piston engine having a centrally located intake valve and an exhaust valve in addition to end located exhaust ports and intake ports to control the flow of air through a cylinder accommodating a pair of pistons. The pistons have a short stroke of approximately one-half the diameter of the pistons. Angularly adjustable cam discs are operable to adjust the individual timing of the valves.

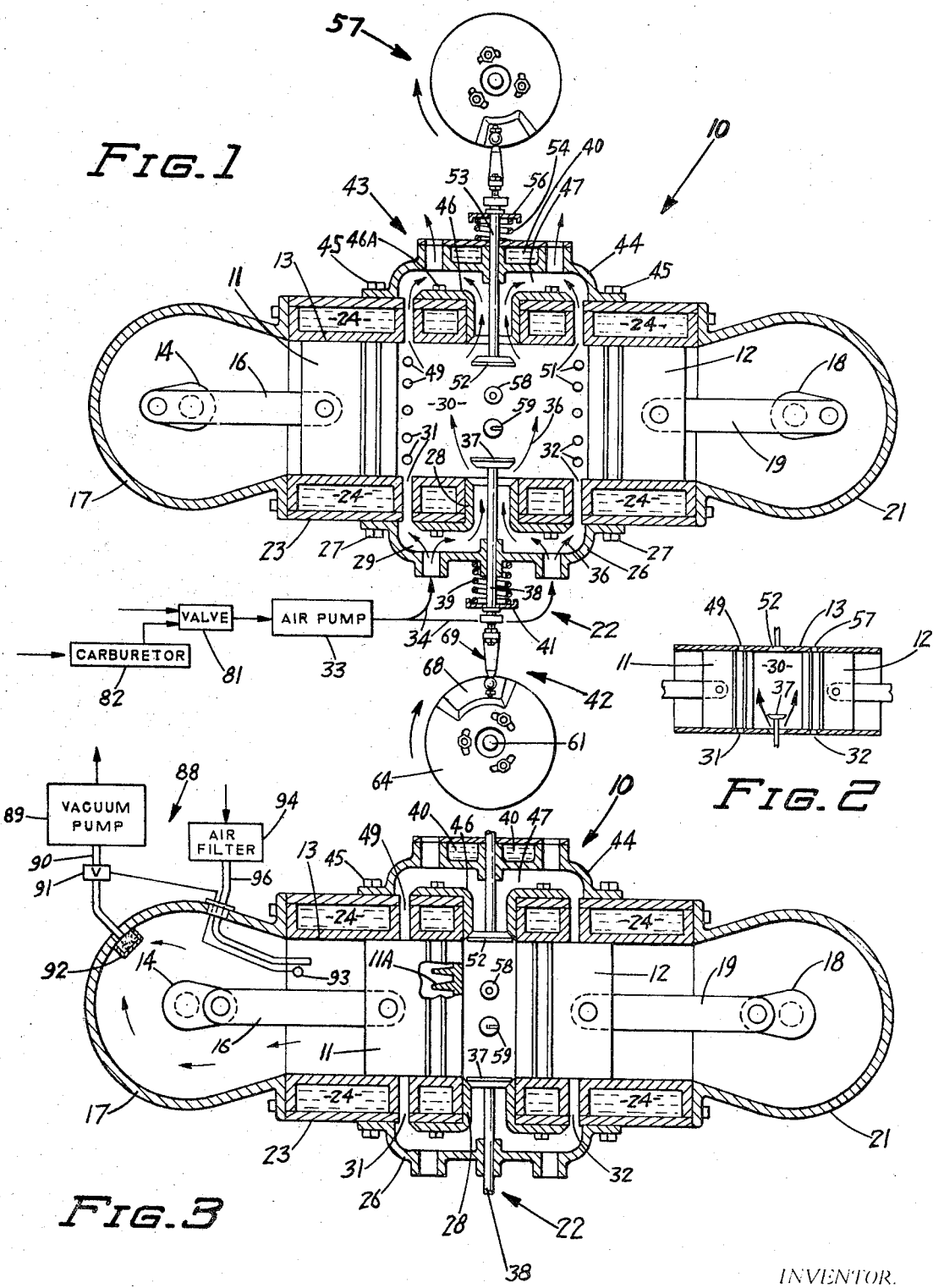

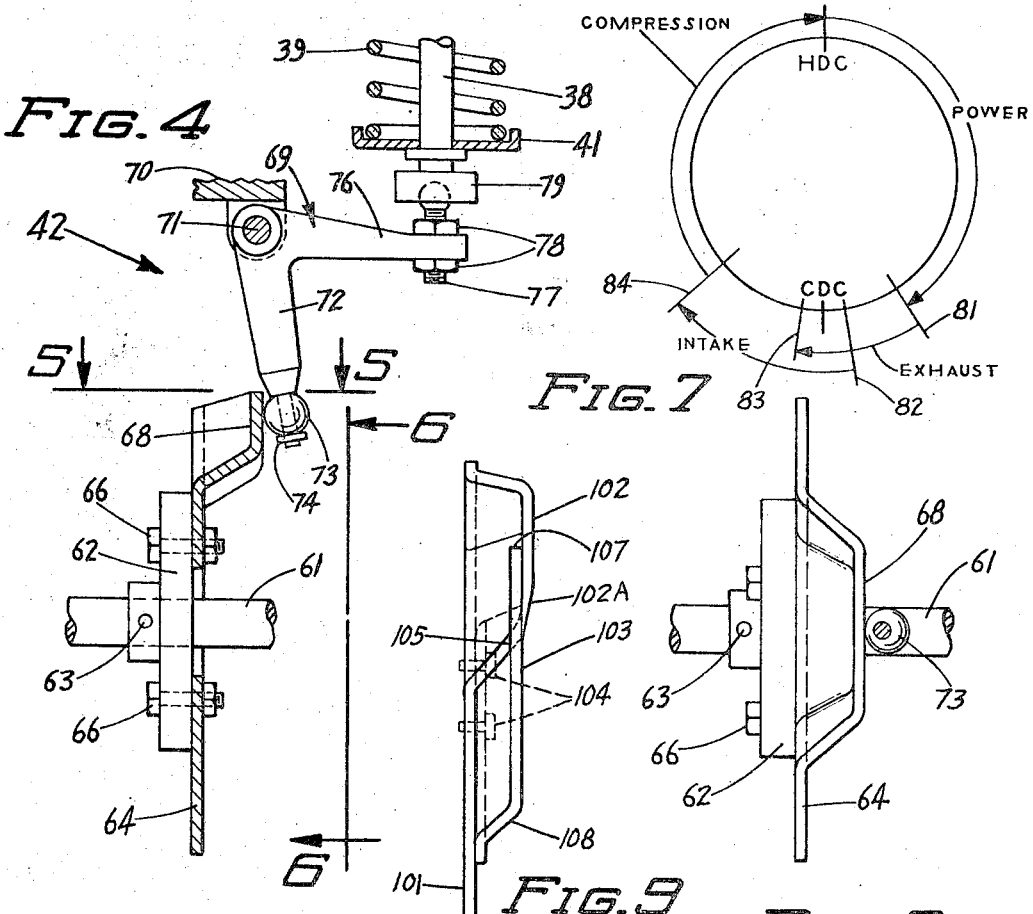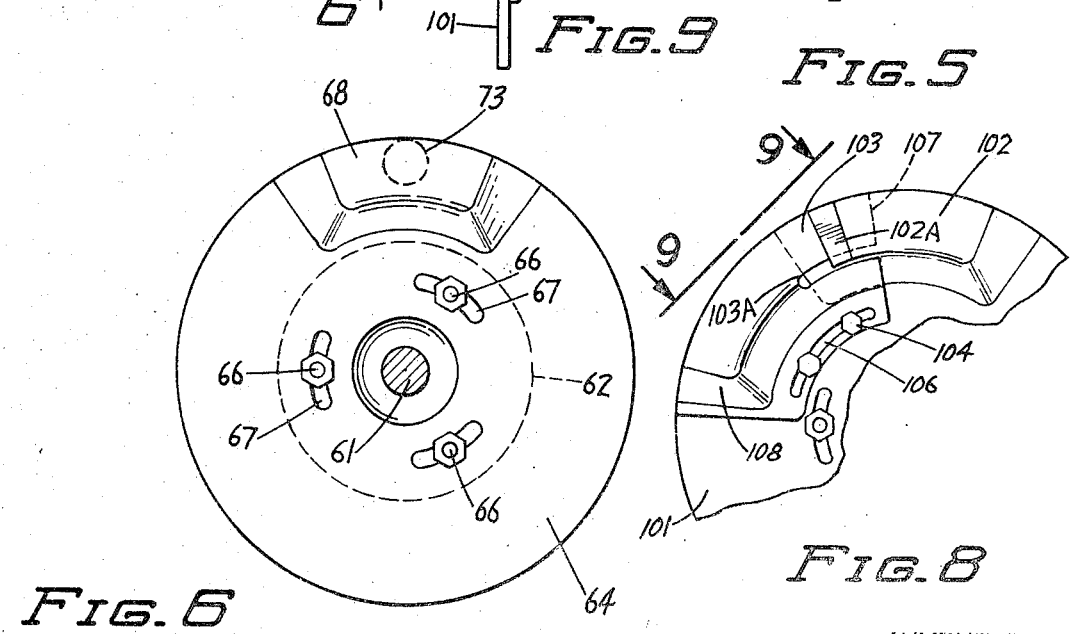

3,550,568

1

OPPOSING PISTON ENGINE

SUMMARY OF INVENTION

The invention broadly relates to an opposing piston engine having a pair of pistons slidably disposed in a single cylinder. The pistons have relatively short strokes which are not greater than the diameter of the pistons. Located in the central portion of the cylinder are intake valve means and exhaust valve means which function in conjunction with intake and exhaust ports to provide for entrance of air and fuel to the cylinder and exhaust of the hot gas from the combustion chamber. Each valve means is operated with a valve actuator having an adjustable cam. The intake valve means is held open during a portion of the compression stroke so that additional amounts of air are supplied to the cylinder. By adjusting the timing of the intake valve means the compression ratio of the engine may be changed. The valve adjusting means includes an angularly adjustable cam disc which has at least one offset portion operative to move a crank arm for opening and closing the valve means. A sector plate can be attached to the cam disc to adjust the duration that the valve is held open. The cam disc is driven in a timed relation with respect to the crank shafts for the pistons so that the opening and closing of the valves is timed in relation to the position of the pistons.

IN THE DRAWINGS

FIG. 1 is a longitudinal sectional view of the opposing piston engine with the pistons in the exhaust position;

FIG. 2 is a diagrammatic view of the engine showing the charging of the engine with air;

FIG. 3 is a view similar to FIG. 1 with each piston at the beginning of the power stroke;

FIG. 4 is a side elevational view partly in section of the cam and lever operators for the intake valve of the engine;

FIG. 5 is a sectional view taken along line 5-5 of FIG. 4;

FIG. 6 is a sectional view taken along line 6-6 of FIG. 4;

FIG. 7 is a diagram of the operating cycle of the engine;

FIG. 8 is a view similar to FIG. 6 showing the cam disc equipped with an adjustable offset sector; and FIG. 9 is a view taken along line 9-9 of FIG. 8.

Referring to the drawings, there is shown in FIG. 1 the internal combustion engine of the invention indicated generally at 10 having opposing pistons 11 and 12 slidably disposed in single cylinder 13. Piston 11 is operatively connected to a crank shaft 14 with a piston rod 16. Piston rod 16 and crank shaft 14 are enclosed in crank case housing 17 secured to one end of the cylinder 13. The opposing piston 12 is connected to a crank shaft 18 by a piston rod 19. A crank case housing 21 surrounds the crank shaft 18 and is secured to the opposite end of the cylinder 13. The stroke of each piston is less than the diameter of the piston. For example, the stroke of the piston may be between 50 percent to 60 percent of the diameter of the piston.

Mounted on one side of the central portion of the cylinder 13 is an intake assembly indicated generally at 22 for supplying the cylinder with air and/or fuel. The cylinder 13 is surrounded with a sleeve housing 23 forming with the cylinder cooling chambers 24 for cooling liquids. The intake assembly cm comprises a manifold 26 secured to the sleeve 23 by bolts 27. The central portion of the manifold 26 has an inwardly directed valve seat sleeve 28 inserted into a central hole in the cylinder 13 and open to the combustion chamber 30 of the engine. The manifold 26 has a passageway 29 which leads to intake ports 31 and 32 and the valve seat sleeve 28. An air pump 33 connected with lines 34 to the manifold 36 provides a continuous supply of air under pressure to the engine. The air flows through the combustion chamber 30 as indicated by the arrows 36.

An intake valve 37 having a valve stem 38 is slidably mounted on manifold 26 in alignment with the valve seat sleeve 28. Cooling chambers 40 surround the valve stem guide. A spring 39 surrounds the stem 38 and engageable with a cap 41 secured to the outer end of the stem 38 biases valve 37 to the closed position. A valve actuator indicated generally at 42 is operable to sequentially open valve 37 whereby the air under pressure flows into the center of combustion chamber 30.

The exhaust gases are removed from the engine through an exhaust assembly indicated generally at 43 comprising a manifold 44 secured to sleeve 23 with bolts 45. The central portion of the manifold 44 has an inwardly projected valve seat sleeve 46 which fits into a radial hole in cylinder 13. Valve sleeve 46 can be a separate member secured to cylinder sleeve 23 with bolts 46A so that the valve seats at the end of sleeve can be replaced or machined without replacing the entire manifold 44. Manifold 44 has a passageway 47 which leads to exhaust ports 49 and 51 and the valve seat sleeve 46 so as to provide the outer end portions as well as the midsection of the combustion chamber 30 with the exhaust exits. The exhaust ports 49 and 51 and intake ports 31 and 32 at opposite ends of the cylinder can be alternately arranged around the cylinder.

Slidably mounted in the center portion of manifold 44 is a valve 52 having an elongated valve stem 53. Surrounding the outer end of the stem 53 is a spring 54 not indicated on diagram, engageable with a cap 56 secured to the end of the stem to bias the valve 52 into a closed position. The valve 52 is moved to an open position by a valve actuator indicated generally at 57. Both valve actuators 42 and 57 are identical in structure and are driven in timed relation with respect to the crank shafts 14 and 18 so that the valves open and close in a timed relation with respect to the positions of the piston 11 and 12. Power transmitting means (not shown) as gear trains or belts driveably connect rotatable shafts of the valve actuators 42 and 57.

The engine 10 is operable either as a diesel engine or as a combustion fuel, as gasoline, engine. Mounted on the cylinder 13 is an injection nozzle 58 operable to inject diesel fuel into the combustion chamber 30 in a manner known in the conventional diesel type engine. In addition, the cylinder carries a spark plug 59 used in the gasoline type engine. The injection nozzle and spark plug can be combined into a single unit threaded into a bore open to the combustion chamber. The spark plug electrode is spaced from and is electrically insulated from the injection nozzle.

Referring to FIGS. 4, 5 and 6, the valve actuator 42 is shown holding valve stem 38 in the open position. The actuator 42 is identical with actuator 57 used to control the opening of the exhaust valve 52. The following description is limited to actuator 42. Valve actuator 42 comprises a driven timing shaft 61 carrying a radial flange 62 adjustably fixed on the shaft 61 with a releasable fastener 63, as a set screw or the like. Secured to the flange 62 is an annular disc or ring cam 64 comprising a flat platelike annulus. A plurality of nut and bolt assemblies 66 secure the cam to the flange 62. As shown in FIG. 6, the flange has circumferential slots 67 for accommodating the nut and bolt assembly 66 so that the cam 64 can be circumferentially adjusted relative to the shaft 61. In this manner, the timing of each individual valve of the engine can be separately adjusted.

An outer peripheral portion of the cam 64 has an offset arcuate section 68 providing camming surfaces to operate a crank indicated generally at 69 for transmitting motion to the valve stem 38. The crank 69 has an apex pivotally mounted on a pivot shaft 71 carried on mount 70. One arm 72 of the crank located adjacent the cam 64 carries a roller 73 held in assembled relation with the arm 72 by a clip 74. The roller 73 rides on a peripheral portion of the cam 64 and follows the contour of the cam. The crank 69 has a second arm 76 located adjacent the end of the valve stem 38. An adjusting screw 77 extended through the outer end of the arm 76 is locked relative to the arm by lock nuts 78. The screw 77 pivotally carries a socket 79 which engages a top of the valve stem 38. The valve clearance is adjusted by changing the position of the screw 77 relative to the arm 76.

The speed of the shaft 61 is controlled by the speed of the crank shafts 14 and 18 so that the valves are opened in a timed relation with respect to the positions of the opposing pistons 11 and 12. The cam 64 may be provided with additional offset sections so that the speed of the shaft 61 may be slower than the speed of rotation of the crank shafts.

Other types of levers and linkages may be used to transmit the motion of the cam to sequentially operate the valve. For example, the arm 72 may be bifurcated and located on adjacent sides of the cam ring 64. Each bifurcated portion of the lever may carry a roller engageable with the cam.

Referring to FIGS. 8 and 9, there is shown a modified cam disc 101 having an offset arcuate section 102. Located adjacent the trailing side of the arcuate section 102 is a sector plate 103 secured to the disc 81 with bolts 104. Sector plate 103 has an arcuate slot 106 receiving the bolts 104 so that the circumferential position of the plate can be adjusted relative to the section 102. Sector plate 103 has a leading edge 107 positioned in an arcuate groove 105 in arcuate section 102. The trailing edge 102A of section 102 is tapered to provide a smooth working surface between the arcuate section 102 and the top of the sector plate 103. Plate 103 has a forwardly open arcuate slot 103A for accommodating an inside portion of section 102 so that the top of plate 103 fits into groove 105. The trailing side 108 of sector plate 103 curves downwardly and rests on the side of cam 101. The length of time that the valve is open can be adjusted by changing the position of the arcuate sector plate 103 relative to the section 102. In this manner, timing and the duration of the opening of each valve can be changed.

Returning to FIG. 1, the engine 10 has an air pump 33 connected to a valve 81 operable to permit air to move into the pump 33 or connect the pump 33 to a carburetor unit 82. The valve 81 is operable to change the engine from a diesel type engine to a gas internal combustion engine. When the carburetor is connected to the air pump, the ignition system including the spark plug 59 is operative to ignite the compressed fuel when the pistons are in their compression stroke position as shown in FIG. 3.

The engine can be modified to operate as a four cycle engine. In a four cycle engine the sleeve 23 is replaced with a sleeve that covers all the intake ports 31 and 32 and exhaust ports 49 and 51. Alternately, shut off valves can be added to the manifolds to close intake ports 31 and 32 and exhaust ports 49 and 51. The timing and speed of the valve operating cam disc can be changed for four cycle operation.

Engine 10 is a two cycle engine having a compression stroke and a power stroke on each revolution of the crank shafts 14 and 16. The operating cycle of the engine is shown in FIG. 7. The power stroke begins at about head dead center (HDC) and ends as the piston approaches crank dead center (CDC). At piston position 81 the exhaust valve 52 is opened permitting the gases to flow into the exhaust manifold. Between positions 82 and 83 both exhaust and intake valves are open thereby allowing the forced air to flow through the combustion chamber 30. At position 83 the exhaust valve 52 is closed while the intake valve 37 remains open to position 84. Between positions 83 and 84 the intake valve 37 is open so that additional amounts of air and/or fuel are introduced into the combustion chamber 30. As shown in FIG. 1, the pistons 11 and 12 are in the exhaust position. In this position, the air is forced through the intake manifolds 26 into the combustion chamber 30 through the inlet ports 31 and 32 and the valve seat sleeve 28. The air is simultaneously forced into opposite ends and the center section of the combustion chamber 30 to provide a rapid purging of the exhaust gases in the combustion chamber. The exhaust valve 52 is in the open position and the exhaust ports 49 and 51 are open so that the air and gases escape into the exhaust manifold 44 from the opposite ends of the combustion chamber 30 as well as the central portion of the chamber 30. Ports 31, 49, 51 and 32 can be interchanged so every other one could be exhaust or intake or any desired arrangement. The air being under pressure provides a rapid and efficient and positive expulsion of the gases from the engine.

Referring to FIG. 2, the pistons 11 and 12 have initially moved toward each other closing the intake ports 31 and 32 and the exhaust ports 49 and 51. The exhaust valve 52 is also closed. The intake valve 37 is open so that the air pump 33 continues to force additional air into the combustion chamber 30. When the pressure of the incoming air is approximately equal to the pressure of the air into the chamber 30, the intake valve 37 closed by the operation of the valve actuator 42. The amount of air introduced into the combustion chamber 30 is regulated by the length of time that the intake valve 37 is open and the pressure of the input air. This adjustment is achieved by relocating the position of the cam 64 relative to the timing drive shaft 61.

As shown in FIG. 3, pistons 11 and 12 are at the end of the compression stroke having moved approximately one-half of the distance of the diameter of the pistons. In this position, the combustion chamber 30 is approximately reduced 8 to 1. The compression ratio of the engine may vary by changing the stroke of the piston and/or the size of the combustion chamber. The injection nozzle 58 is operated at this point to introduce diesel or similar fuel to the compressed air in the combustion chamber 30. The rapid burning of the fuel forces the piston 11 and 12 in opposite directions rotating the crank shafts 14 and 18. When the pistons are located at the bottom of their stroke, the intake and exhaust valves are opened and the intake and exhaust ports are exposed whereby the hot gases flow into the exhaust manifold. Simultaneously with the expulsion of exhaust gases from the combustion chamber 30 there is an introduction of air for the next cycle of the engine.

The operation of the engine on gasoline is achieved by changing the valve 81 to draw the air through the carburetor 82 into the air pump 33. The air along with vaporized gasoline or other fuel or air is introduced into the intake manifold 26 and forced into the combustion chamber 30 between the pistons 11 and 12. As shown in FIG. 3, when the pistons 11 and 12 compress the fuel and air, the spark plug 59 is operative to ignite the fuel driving the pistons back to their opposed positions shown in FIG. 1. In this position, the exhaust valve 52 and along with the exhaust ports 49 and 51 are opened to provide egress passages for the exhaust gases. At the same time, an additional charge of fuel and air begins to flow into the combustion chamber 30. The amount of fuel and air that is introduced into the combustion chamber 30 can be regulated by changing the circumferential position of the cam 64 to change the timing of the valve 37. The ring 64 is angularly moved relative to the flange by loosening the nut and bolt assembly 66 so that the ring can be moved relative to the flange.

The engine 10 may have additional opposing pistons and cylinders connected to the crank shafts 14 and 18. These additional opposing pistons can operate in a time relationship relative to each other to provide a smooth and even power to the crank shafts 14 and 18. Each piston and cylinder assembly is selectively operated through a separate valve actuator having an adjustable cam 64 so that the timing of each valve may be adjusted. The valve cam for additional cylinder may be carried on the flange 62 or similar flanges mounted on the timing drive shaft 61.

Returning to FIG. 3, there is shown a piston cooling system indicated generally at 88 associated with the crank case 17 for cooling the piston 11. A similar cooling system can be used to cool the other pistons of the engine. The cooling system 88 comprises a vacuum pump 89 for evacuating air from the crank case chamber. Pump 89 has an inlet 90 connected to a temperature controlled valve 91. An air and oil separator 92 located in the crank case is connected to the valve 91. On operation of the pump 89, the air in the crank case moves through the separator 92 to valve 81 and pump 89.

If the temperature in the crank case is sufficiently high, the valve 91 is open allowing the air to be evacuated from the crank case chamber. A temperature sensor 93 located in the crank case chamber adjacent the base of the cylinder 13 is connected with a suitable line to the valve 91. As the temperature in the crank case chamber increases, the temperature sensor sends signals to the valve 91 to open the valve whereby the air in the crank case chamber is evacuated by the vacuum pump 89. Vacuum pressure in the crank case chamber draws fresh clean air through an air filter 94 and line or tube 96 into the base of the cylinder. The air is directed toward the cylinder head which has outwardly projected fins or ribs 11A.

I claim:

1. An internal combustion engine comprising: a cylinder, opposed pistons in the cylinder on opposite sides of a combustion chamber, intake valve means located in the center portion of the cylinder between the pistons, intake ports and exhaust ports in the cylinder open to the ends of the combustion chamber, said ports being opened and closed by the pistons, exhaust valve means located in the center portion of the cylinder and exhaust valve actuator means for opening said exhaust valve means, means to supply air under pressure to the combustion chamber through said intake valve means and intake ports, and intake valve actuator means operable to open and hold open said intake valve means after said intake ports are closed whereby additional air is introduced in the combustion chamber.

2. The engine of claim 1 wherein each of the pistons have a stroke less than the diameter of the piston.

3. The engine of claim 2 wherein the stroke is between 50 percent to 60 percent of the diameter of the piston.

4. The engine of claim 1 including a first crank shaft connected to one piston and a second crank shaft connected to the other piston, and means for timing the crank shafts with the operation of the intake valve means and exhaust valve actuator means.

5. The engine of claim 4 including crank case housings secured to opposite ends of the cylinder.

6. The engine of claim 1 wherein at least one valve actuator means includes a rotary cam and means to adjust the circumferential position of the cam whereby the timing of the valve means relative to the position of the pistons can be changed.

7. The engine of claim 6 wherein the cam is a disc having a laterally offset portion.

8. The engine of claim 6 including an offset sector plate secured to the disc adjacent the offset portion to increase the effective circumferential length of the offset portion.

9. The engine of claim 8 including means to circumferentially adjust the sector plate on the disc.

10. The engine of claim 1 wherein at least one actuator means comprises a lever engageable with the valve means, a disc cam having at least one side engageable with the lever, a rotatable shaft and means adjustably mounting the disc cam on the shaft, said disc cam having a laterally offset portion for moving the lever to open the valve means.

11. The engine of claim 1 wherein the means to supply air to the combustion chamber comprises an air pump means and valve means operable to connect the pump means to a carburetor unit.

12. The engine of claim 1 including manifold means removably mounted on the cylinder carry the intake valve means and exhaust valve means.

13. An internal combustion engine comprising: a cylinder, opposing pistons slidably disposed in the cylinder on opposite sides of a combustion chamber, intake valve means located in the center portion of the cylinder between the pistons, exhaust means including means at the opposite end of the cylinder to vent the gases from the combustion chamber, and exhaust valve means located in the center portion of the cylinder to vent the gases from the combustion chamber, actuator means for opening said exhaust valve means, means to supply air under pressure to the combustion chamber through said intake valve means, and intake valve actuator means operable to open said intake valve means, whereby air under pressure is introduced into the combustion chamber.

14. The engine of claim 13 comprising intake ports in the cylinder open to the ends of the combustion chamber, said intake ports being opened and closed by the pistons.

15. The engine of claim 13 wherein said intake valve actuator means is operable to open and hold open said intake valve means after said exhaust means is closed, whereby additional air under pressure is introduced into the combustion chamber.